United States Patent
Langenbrunner et al.

(10) Patent No.: US 10,808,574 B2
(45) Date of Patent: Oct. 20, 2020

(54) TURBOMACHINE STATOR TRAVELLING WAVE INHIBITOR

(71) Applicant: General Electric Company, Schenectady, NY (US)

(72) Inventors: Leslie Louis Langenbrunner, Cincinnati, OH (US); Tod Robert Steen, West Chester, OH (US)

(73) Assignee: General Electric Company, Schenectady, NY (US)

( * ) Notice: Subject to any disclaimer, the term of this patent is extended or adjusted under 35 U.S.C. 154(b) by 971 days.

(21) Appl. No.: 15/263,471

(22) Filed: Sep. 13, 2016

(65) Prior Publication Data

US 2018/0073522 A1    Mar. 15, 2018

(51) Int. Cl.
*F01D 25/24* (2006.01)
*F01D 25/04* (2006.01)
*F02K 3/06* (2006.01)

(52) U.S. Cl.
CPC ............ *F01D 25/24* (2013.01); *F01D 25/04* (2013.01); *F02K 3/06* (2013.01); *F05D 2220/323* (2013.01); *F05D 2220/36* (2013.01); *F05D 2260/96* (2013.01); *F05D 2300/10* (2013.01); *F05D 2300/603* (2013.01); *Y02T 50/672* (2013.01)

(58) Field of Classification Search
CPC ......... F01D 25/04; F01D 25/24; F04D 29/522
See application file for complete search history.

(56) References Cited

U.S. PATENT DOCUMENTS

| 6,206,155 B1 * | 3/2001 | Schneider ............... F16F 7/003 188/376 |
| 7,565,796 B2 * | 7/2009 | Eleftheriou ........... F01D 25/162 415/9 |

(Continued)

FOREIGN PATENT DOCUMENTS

EP    2 929 999 A1    10/2015

OTHER PUBLICATIONS

International Invitation to Pay Additional Fees issued in connection with corresponding PCT Application No. PCT/US2017/040964 dated Jan. 3, 2018.

(Continued)

*Primary Examiner* — Woody A Lee, Jr.
(74) *Attorney, Agent, or Firm* — Dority & Manning, P.A.

(57) ABSTRACT

A turbomachine assembly includes annular stator surrounding rotor circumscribed and rotatable about centerline axis. One or more non-axisymmetric partial arc annular circular stiffeners are disposed around and on stator and may be helical. Non-axisymmetric partial arc annular circular stiffeners may extend about one third to one half of a circumference, be hollow, and located over one or more blade stages of rotor. One or more annular mid-span flanges may be attached to stator and axially positioned within the hollow partial arc annular circular stiffeners. One or more masses or externals may be attached to the stator or to at least one of the one or more annular mid-span flanges between ends of partial arc annular circular stiffeners. Annular stator and rotor may have matching frequencies causing rotating stator waves rotating with rotor. The stator may be fan casing surrounding fan rotor or labyrinth seal land surrounding labyrinth seal teeth.

21 Claims, 5 Drawing Sheets

(56) References Cited

U.S. PATENT DOCUMENTS

| | | | |
|---|---|---|---|
| 7,594,405 B2* | 9/2009 | Somanath | F01D 25/162 |
| | | | 415/213.1 |
| 8,133,011 B2 | 3/2012 | Cortequisse | |
| 8,147,191 B2 | 4/2012 | Baumhauer et al. | |
| 8,375,699 B1 | 2/2013 | Atassi et al. | |
| 8,684,671 B2 | 4/2014 | Froissart et al. | |
| 9,003,852 B2* | 4/2015 | Green | F01D 25/24 |
| | | | 72/168 |
| 9,151,181 B2* | 10/2015 | Robertson | F01D 25/005 |
| 9,498,850 B2* | 11/2016 | Denis | B23K 31/02 |
| 2004/0243310 A1 | 12/2004 | Griffin et al. | |
| 2009/0297331 A1* | 12/2009 | Caucheteux | F01D 11/122 |
| | | | 415/1 |
| 2010/0242494 A1 | 9/2010 | Mulcaire | |
| 2012/0034076 A1* | 2/2012 | Xie | F01D 21/045 |
| | | | 415/200 |
| 2012/0321443 A1 | 12/2012 | Ravey et al. | |
| 2016/0076396 A1 | 3/2016 | Eshak et al. | |

OTHER PUBLICATIONS

International Search Report and Written Opinion issued in connection with corresponding PCT Application No. PCT/US2017/040964 dated Mar. 5, 2018.

* cited by examiner

TURBOMACHINE STATOR TRAVELLING WAVE INHIBITOR

GOVERNMENT INTERESTS

This invention was made with government support under government contract No. FA8650-09-D-2922 by the Department of Defense. The government has certain rights to this invention.

BACKGROUND OF THE INVENTION

Technical Field

The present invention relates generally to turbomachinery stators such as casings surrounding rotors and, more specifically, features designed to inhibit destructive modal interactions between rotors and stators by inhibiting travelling waves in the stators.

Background Information

Turbomachinery such as gas turbine engines may be used for power generation and for aircraft and marine propulsion and other applications. Turbomachinery and other machinery incorporate rotors that spin or rotate with a surrounding stator such as an aircraft gas turbine engine fan rotor rotating within a fan casing which is a stator. Interaction from a rotor rubbing on stator can cause an unstable resonance if the rotor and stator have matching frequencies and the stator waves rotate or travels with the rotor. One design to avoid this problem adds 360 degree stiffening rings or ribs to the stator moving the resonance above operating rotor speed.

U.S. Pat. No. 8,684,671 states it is known in the prior art to stiffen the casing by circumferential stiffeners in order to increase the propagation speed of rotating waves in the casing. U.S. Pat. No. 8,684,671 teaches a turbomachine casing forming a continuous annular ring extending over 360 degrees around a bladed wheel and serving as a propagation medium for rotating waves, each rotating wave being generated by two standing waves of the same frequency, and the casing including at least one longitudinal stiffener at its outer periphery that is dimensioned and positioned in such a manner as to separate the frequencies of two standing waves of at least one given rotating wave.

Nevertheless, stiffening the casing can be insufficient or it can lead to adding thicknesses of material on the casing that are unacceptable in terms of the weight and/or space requirements that are to be satisfied.

The 360 degree stiffening ribs are large and take up weight and valuable space that is often needed by engine external hardware or externals. It is desirable to use lighter weight and smaller features to avoid resonance problems associated with travelling waves.

BRIEF DESCRIPTION OF THE INVENTION

A turbomachine assembly includes an annular stator surrounding a rotor which are circumscribed about a centerline axis. The rotor is rotatable about the centerline axis and one or more non-axisymmetric partial arc annular circular or helical stiffeners are disposed around and on the stator.

The one or more non-axisymmetric partial arc annular circular stiffeners may be hollow. One or more annular mid-span flanges may be disposed around and attached to the stator. One or more masses such as turbomachine externals may be attached to the stator or to at least one of the one or more annular mid-span flanges between circumferential ends of the partial arc annular circular stiffeners. The stator may extend axially between forward and aft flanges of the stator.

The partial arc annular circular stiffeners may extend around from about one third to one half of a circumference of the stator. The partial arc annular circular stiffeners may be located over one or more blade stages of the rotor. The mid-span flanges may be axially positioned within the hollow partial arc annular circular stiffeners.

The annular stator and the rotor having matching frequencies that cause rotating stator waves that rotate or travel with the rotor. The annular stator may be made from a composite material.

An aircraft gas turbine engine may incorporate an annular fan casing as the annular stator surrounding a fan rotor and the one or more non-axisymmetric partial arc annular circular or helical stiffeners around and on the fan casing.

An aircraft gas turbine engine includes a stator with a labyrinth seal land mounted to a non-rotating casing, labyrinth seal teeth mounted on a rotor in sealing relationship with the labyrinth seal land, and one or more non-axisymmetric partial arc annular circular or helical stiffeners around and on the non-rotating casing.

BRIEF DESCRIPTION OF THE DRAWINGS

The subject matter which is regarded as the invention is particularly pointed out and distinctly claimed in the concluding part of the specification. The invention, in accordance with preferred and exemplary embodiments, together with further objects and advantages thereof, is described in the following detailed description taken in conjunction with the accompanying drawings in which:

DETAILED DESCRIPTION OF THE INVENTION

Figure 1:
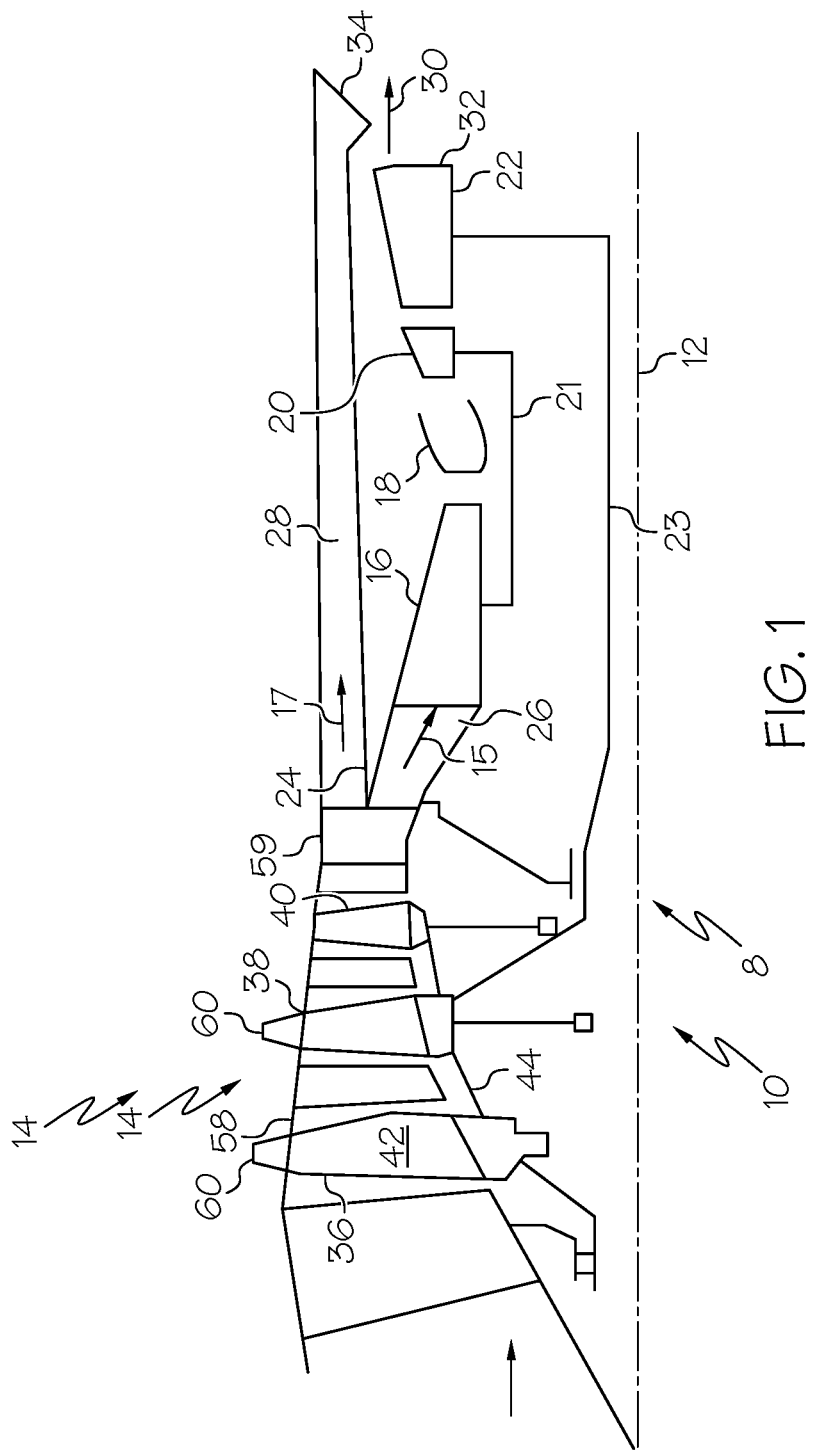
FIG. 1 is a longitudinal diagrammatical view illustration of an exemplary embodiment of an aircraft gas turbine engine with an exemplary non-axisymmetric feature on a fan case illustrated herein as a non-axisymmetric rib stiffener.

Illustrated in FIG. 1 is an exemplary turbomachine illustrated as an aircraft turbofan gas turbine engine 10 circumscribed about an engine centerline axis 12. The engine 10 generally represents a turbomachine 8 and includes, in downstream serial flow communication, a fan section 14, a high pressure compressor 16, a combustor 18, a high pressure turbine (HPT) 20, and a low pressure turbine (LPT) 22.

The HPT or high pressure turbine 20 is joined by a high pressure drive shaft 21 to the high pressure compressor 16. The LPT or low pressure turbine 22 is joined by a low pressure drive shaft 23 to the fan section 14. A flow splitter 24 surrounding the high pressure compressor 16 immediately behind the fan section 14 splits fan air 26 pressurized by the fan section 14 into a radially inner stream of core air flow 15 channeled through the high pressure compressor 16 and a radially outer stream of bypass air flow 17 channeled through a bypass duct 28 surrounding the high pressure compressor 16, combustor 18, high pressure turbine 20, and low pressure turbine 22. Exhaust gas 30 from the low pressure turbine 22 and bypass air flow 17 are directed into an exhaust section 32 and then into an exhaust nozzle 34.

Figure 2:
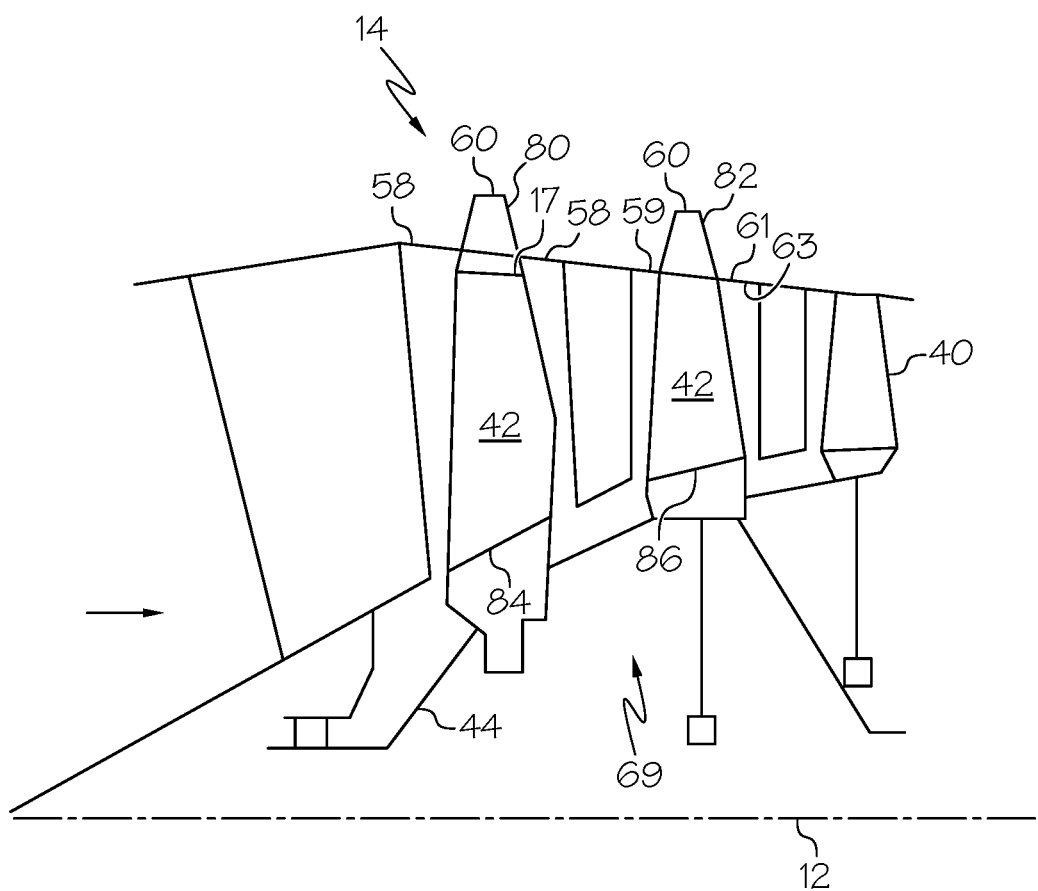
FIG. 2 is a longitudinal sectional diagrammatical view illustration of an exemplary embodiment of an aircraft gas turbine engine with an exemplary non-axisymmetric feature on the fan case illustrated herein as a non-axisymmetric rib stiffener surrounding a fan rotor illustrated in FIG. 1.

Further referring to FIG. 2, the exemplary fan section 14 includes a fan rotor 44 having first, second, and third fan blade stages 36, 38, 40 each containing a circular row of fan blades 42. An annular fan casing 58 circumscribed about the engine centerline axis 12 surrounds the fan blade stages and may extend axially between forward and aft flanges 55, 57 of the annular fan casing 58 illustrated in FIG. 3. The fan casing 58 may be referred to as a stator 59 surrounding a rotor 44 forming, in part, an assembly 69. The fan casing 58 or stator 59 may be made from a composite or metallic material and includes radially outer and inner sides 61, 63 facing away from and towards the rotor 44 respectfully. The assembly of the rotor and casing may experience interaction due to the rotor rubbing on stator. The rubbing can cause an unstable resonance if the rotor and stator have matching frequencies causing stator waves that may rotate or travel with the rotor.

Figure 3:
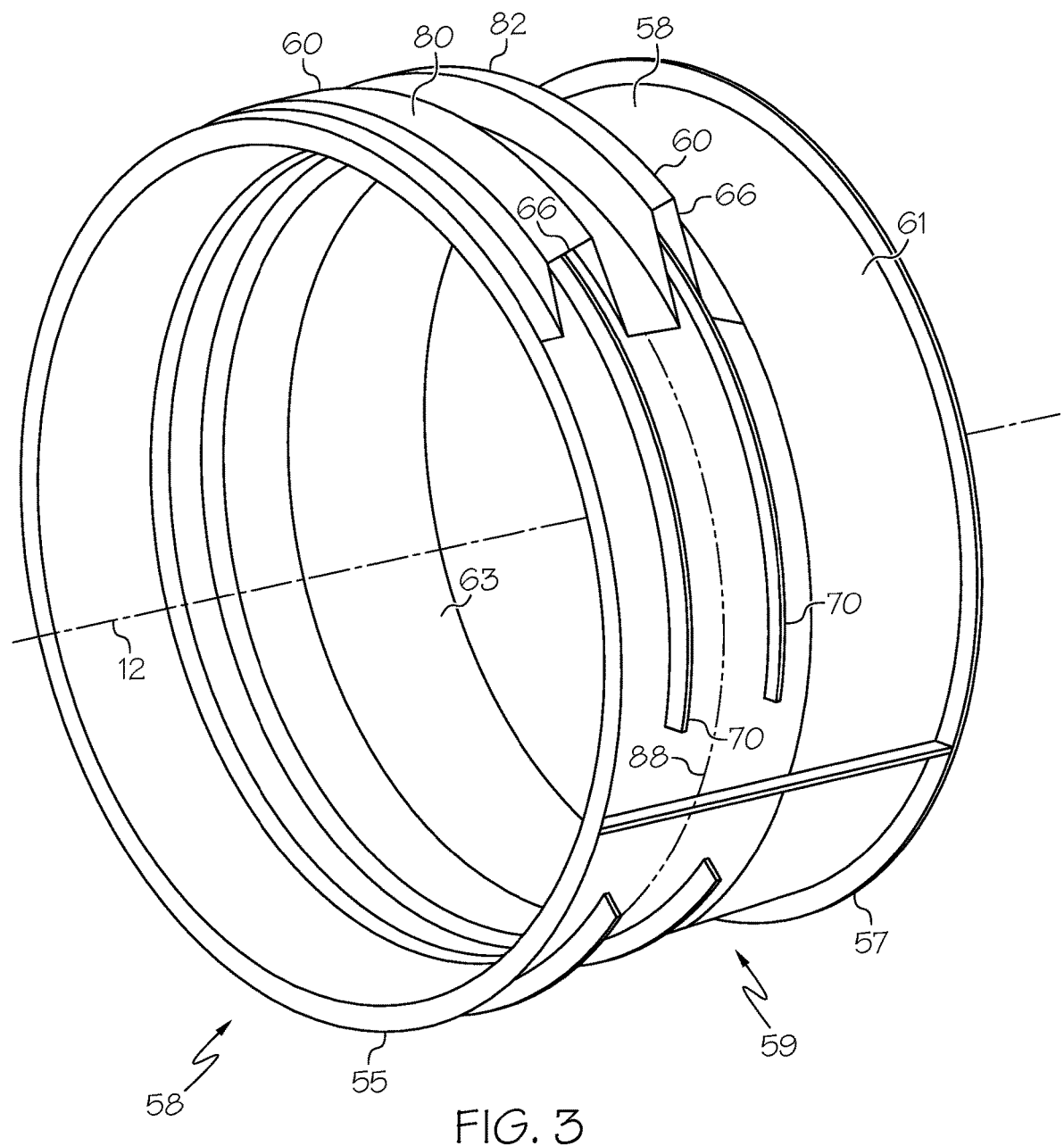
FIG. 3 is a perspective view illustration of an exemplary stator casing with a non-axisymmetric rib stiffener as illustrated in FIG. 2.
Figure 4:
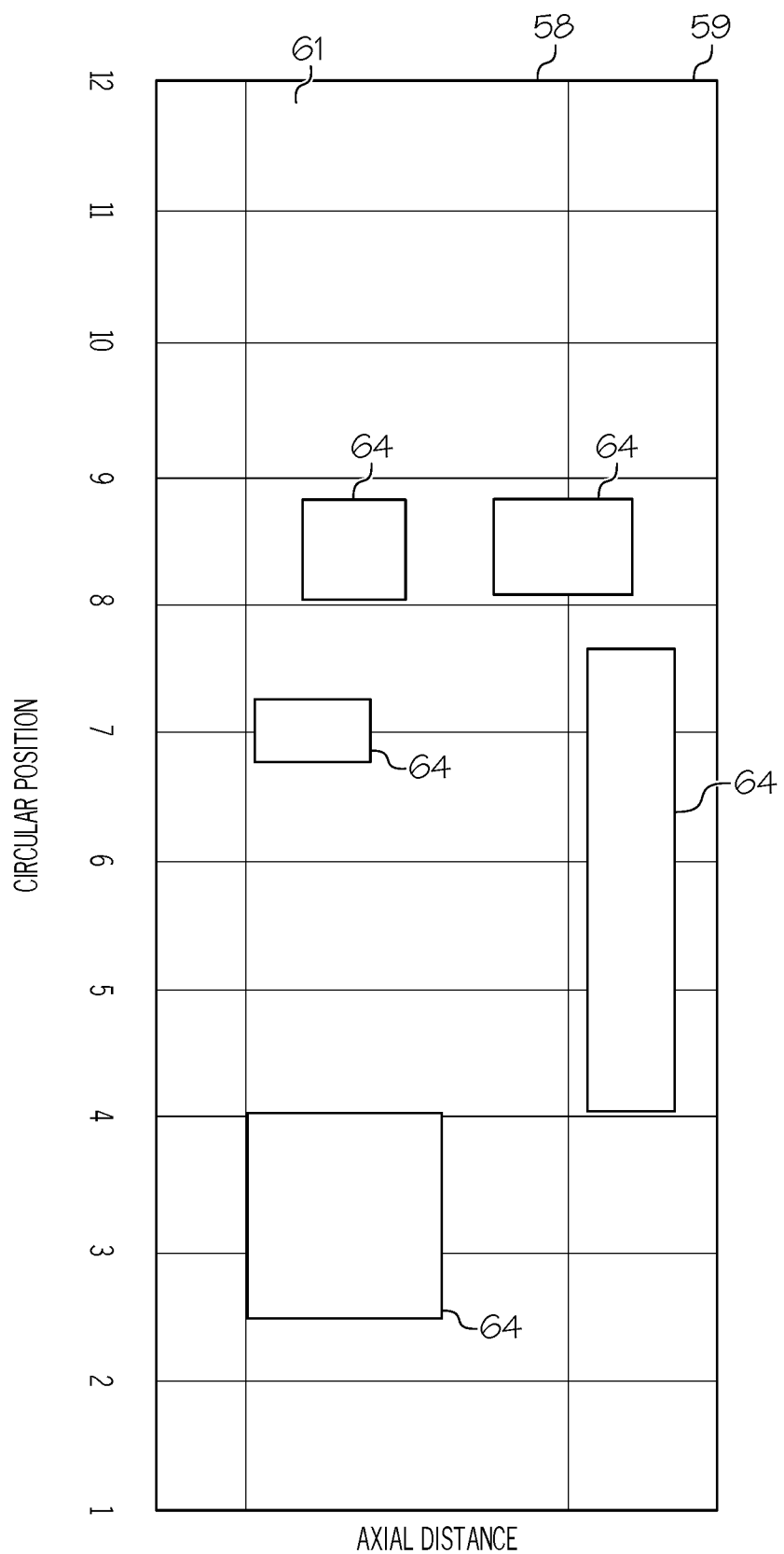
FIG. 4 is a schematical diagrammatical view illustration of externals mounted on the stator casing illustrated in FIG. 3.

Referring to FIGS. 2 and 3 in the exemplary turbomachine 8 and engine 10 illustrated herein, the fan blades 42 of first, second, and third fan blade stages 36, 38, 40 may rub against the stator 59 illustrated herein as the fan casing 58. Non-axisymmetric features on the fan casing 58 including partial arc annular circular stiffeners 60 and masses such as engine externals 64 are located on the radially outer sides 61 of the casing 58 or stator 59 as illustrated in FIG. 4. These non-axisymmetric features on the fan casing 58 or the stator 59 provide a turbomachine stator travelling wave inhibitor. The partial arc annular circular stiffeners 60 provide room to locate externals 64 between circumferential ends 66 of each of the partial arc annular circular stiffeners 60.

The partial arc annular circular stiffeners 60 may be hollow to save weight and also provide room to place annular mid-span flanges 70 around the casing and which are used to fasten the externals 64 and other masses to the casing 58. The annular mid-span flanges 70 may be axially positioned within the hollow partial arc annular circular stiffeners 60. The partial arc annular circular stiffeners 60 provide most of the prevention of the traveling waves and masses such as engine externals 64 located on the casing 58 or stator 59 can also be used to help with the prevention depending on the size of these masses and their circumferential locations.

The partial arc annular circular stiffeners 60 primarily prevent or inhibit the traveling waves in the stator 59 or casing 58. The masses and externals and their circumferential locations can also be used to a lesser extent to prevent or inhibit the traveling waves in the stator 59 or casing 58. One experimental model uses first and second partial arc annular stiffeners 80, 82 around the casing 58 over the first and second fan blade stages 36, 38, containing first and second circular rows 84, 86 of fan blades 42. The first and second partial arc annular stiffeners 80, 82 extend around from about one third to one half of a circumference 88 of the casing 58. We found that this was strong enough to prevent or inhibit N=3-8 traveling waves.

Often there are externals 64 with significant mass mounted on the fan stator 59 or casing 58. FIG. 4 illustrates exemplary circular locations of several externals 64 such as an oil tank for example. We found they too could prevent or inhibit traveling waves. But depending on the size of these masses and circumferential locations, they were not necessarily successful in stopping the rotation of all the mode shapes N=3-8. These externals could circumferentially fit between the circumferential ends 66 of the first and second partial arc annular stiffeners 80, 82 around the casing 58 illustrated in FIGS. 3 and 4.

Figure 5:
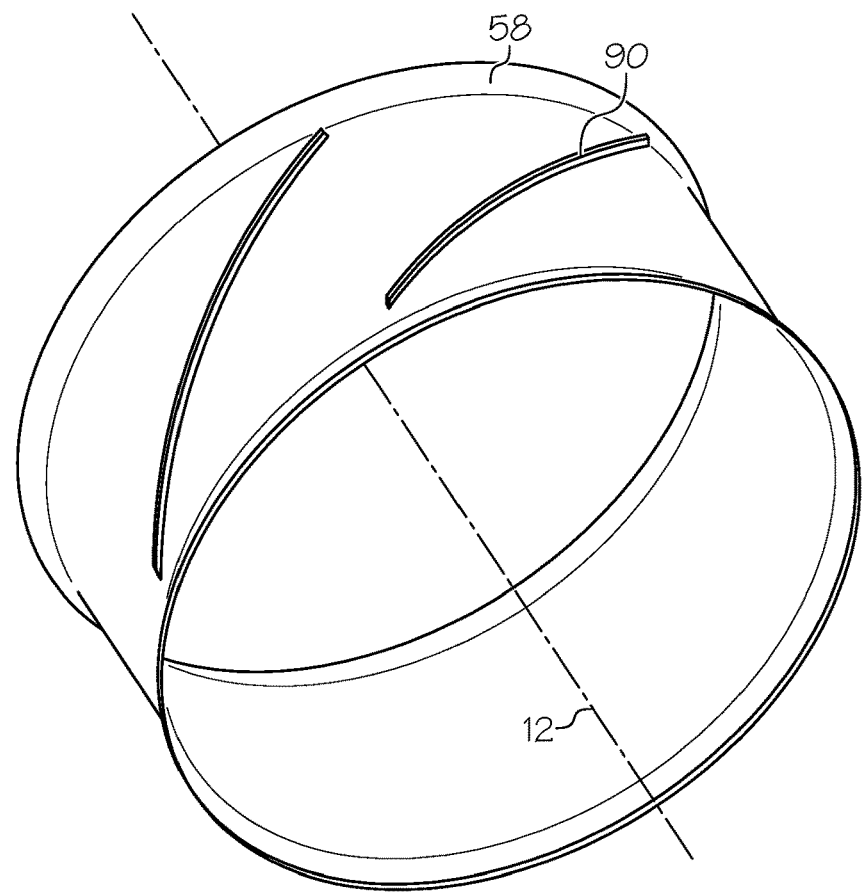
FIG. 5 is a diagrammatical perspective view illustration of a second exemplary stator casing with a non-axisymmetric helical rib stiffener.
Figure 6:
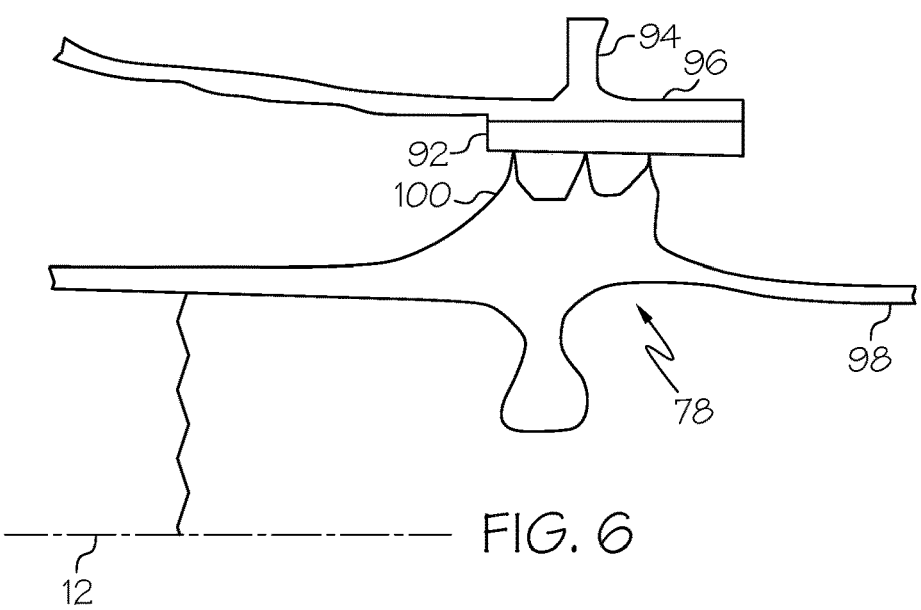
FIG. 6 is a longitudinal diagrammatical view illustration of an exemplary labyrinth seal land mounted to a non-rotating casing and a non-axisymmetric rib stiffener mounted on the casing.

FIG. 5 illustrates partial arc annular helical stiffeners 90 as compared to the circular partial arc annular circular stiffeners 60 illustrated in FIG. 3. The partial arc annual helical stiffeners 90 are non-axisymmetric partial arc annular stiffeners illustrated on a fan casing 58. FIG. 6 illustrates another embodiment of a partial arc annular circular stiffener 60 around a stator 59 surrounding a rotor 98. FIG. 6 illustrates a labyrinth seal assembly 78 circumscribed about an engine centerline axis 12. The labyrinth seal assembly 78 includes a stator 59 having a labyrinth seal land 92 mounted to a non-rotating casing 96 around which is at least one partial arc annular stiffener 94. The partial arc annular stiffener 94 illustrated as being integral or monolithically formed with the non-rotating casing 96. Labyrinth seal teeth 100 are mounted on the rotor 98 in sealing relationship with the labyrinth seal land 92 in the labyrinth seal assembly 78. The labyrinth seal assembly may experience interaction due to the rotor rubbing on stator. The rubbing can cause an unstable resonance if the rotor and stator have matching frequencies causing stator waves that may rotate or travel with the rotor.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed:

1. A turbomachine assembly comprising:
an annular fan casing surrounding a fan rotor,
the casing and the rotor circumscribed about a centerline axis,
the rotor rotatable about the centerline axis, and
one or more non-axisymmetric partial arc annular circular stiffeners around and on the casing, wherein a portion of the one or more non-axisymmetric partial arc annular circular stiffeners define an enclosed hollow cavity, and wherein the one or more non-axisymmetric partial arc annular circular stiffeners inhibit traveling waves in the casing due to modal interactions between the fan rotor and the casing.

2. The assembly as claimed in claim 1 further comprising one or more annular mid-span flanges around and attached to the casing.

3. The assembly as claimed in claim 2 further comprising one or more masses attached to the casing or to at least one of the one or more annular mid-span flanges between circumferential ends of the partial arc annular circular stiffeners.

4. The assembly as claimed in claim 3 further wherein the one or more masses include one or more turbomachine externals.

5. The assembly as claimed in claim 4 further comprising the casing extending axially between forward and aft flanges of the casing.

6. The assembly as claimed in claim 2 further comprising one or more of the one or more non-axisymmetric partial arc annular circular stiffeners extending around from one third to one half of a circumference of the casing.

7. The assembly as claimed in claim 6 further comprising one or more masses and/or one or more turbomachine externals attached to the casing or to at least one of the one or more annular mid-span flanges between circumferential ends of the partial arc annular circular stiffeners.

8. The assembly as claimed in claim 2 further comprising one or more of the one or more non-axisymmetric partial arc annular circular stiffeners located over one or more blade stages of the rotor.

9. The assembly as claimed in claim 8 further comprising one or more masses and/or one or more turbomachine externals attached to the casing or to at least one of the one or more annular mid-span flanges between circumferential ends of the partial arc annular circular stiffeners.

10. The assembly as claimed in claim 9 further comprising one or more of the one or more non-axisymmetric partial arc annular circular stiffeners extending around from one third to one half of a circumference of the casing.

11. The assembly as claimed in claim 2 further comprising a portion of the one or more annular mid-span flanges axially positioned within the enclosed hollow cavity defined by the partial arc annular circular stiffeners.

12. The assembly as claimed in claim 1 further comprising the annular casing and the rotor having matching frequencies that cause the waves that rotate or travel with the rotor.

13. The assembly as claimed in claim 1 further comprising the annular casing is made from a composite or metallic material.

14. An aircraft gas turbine engine comprising:
an annular fan casing surrounding a fan rotor,
the casing and the rotor circumscribed about a centerline axis,
the rotor rotatable about the centerline axis, and
one or more non-axisymmetric partial arc annular circular stiffeners around and on the casing, wherein a portion of the one or more non-axisymmetric partial arc annular circular stiffeners define an enclosed hollow cavity, and wherein the one or more non-axisymmetric partial arc annular circular stiffeners inhibit traveling waves in the casing due to modal interactions between the fan rotor and the casing.

15. The engine as claimed in claim 14 further comprising one or more annular mid-span flanges around and attached to the casing.

16. The engine as claimed in claim 15 further comprising one or more masses or engine externals attached to the casing or to at least one of the one or more annular mid-span flanges between circumferential ends of the partial arc annular circular stiffeners.

17. The engine as claimed in claim 16 further comprising one or more of the one or more non-axisymmetric partial arc annular circular stiffeners extending around from one third to one half of a circumference of the casing.

18. The engine as claimed in claim 15 further comprising a portion of the one or more annular mid-span flanges axially positioned within the enclosed hollow cavity defined by the partial arc annular circular stiffeners.

19. The engine as claimed in claim 15 further comprising one or more of the one or more non-axisymmetric partial arc annular circular stiffeners located over one or more blade stages of the rotor.

20. The engine as claimed in claim 14 further comprising the annular casing and the rotor having matching frequencies that cause the waves that rotate or travel with the rotor.

21. The engine as claimed in claim 14 further comprising the annular casing is made from a composite material.

* * * * *